United States Patent [19]

Momiyama

[11] Patent Number: 4,796,714
[45] Date of Patent: Jan. 10, 1989

[54] POWER STEERING SYSTEM FOR USE IN LARGE VEHICLE

[75] Inventor: Fujio Momiyama, Hino, Japan

[73] Assignee: Hino Jidosha Kogyo Kabushiki Kaisha, Tokyo, Japan

[21] Appl. No.: 935,304

[22] Filed: Nov. 26, 1986

[30] Foreign Application Priority Data

Nov. 30, 1985 [JP] Japan .................. 60-270455

[51] Int. Cl.⁴ .......................... B62D 5/06; B62D 5/08
[52] U.S. Cl. ................................ 180/143; 180/162; 180/163
[58] Field of Search ............... 180/132, 141, 143, 152, 180/155, 156, 157, 158, 159, 161, 162, 163, 133, 142

[56] References Cited

U.S. PATENT DOCUMENTS

| | | | |
|---|---|---|---|
| 3,554,089 | 1/1971 | Lang | 180/133 |
| 3,832,849 | 9/1974 | Lang | 180/133 |
| 4,189,024 | 2/1980 | Jablonsky | 180/133 |
| 4,382,483 | 5/1983 | Spencer | 180/153 |
| 4,463,557 | 8/1984 | Miller | 180/132 |
| 4,463,558 | 8/1984 | Miller | 180/132 |

*Primary Examiner*—David M. Mitchell
*Assistant Examiner*—Everett G. Diederiks, Jr.
*Attorney, Agent, or Firm*—Staas & Halsey

[57] ABSTRACT

A power steering system for use in a large vehicle comprises: a main booster; an auxiliary booster; a main hydraulic line for connecting the main booster to a hydraulic pump; an auxiliary hydraulic line branching off from the main hydraulic line and connecting the auxiliary booster to the hydraulic pump; a control valve disposed in the main hydraulic line; a reaction pressure supply passage for the control valve; a reaction pressure supply-side variable throttle disposed in the reaction pressure supply passage; a reaction pressure relief-side variable throttle disposed in a reaction pressure relief passage for the control valve; and a load sensing valve. A controller opens and closes the variable throttles in response to the vehicle speed to control the flow rate of hydraulic oil flowing into a reaction chamber of the control valve and flowing out from the reaction chamber, and a hydraulic reaction force generated in the control valve is controlled. At that juncture, the load sensing valve is opened and closed in response to the load applied to the main booster, thereby allowing the auxiliary booster to compensate the steering power of the main booster.

7 Claims, 5 Drawing Sheets

Fig. 12

POWER STEERING SYSTEM FOR USE IN LARGE VEHICLE

BACKGROUND OF THE INVENTION

1. Field of the Invention

The present invention relates to a power steering system for use in a large vehicle which is of the speed-responsive and load-responsive type.

2. Description of the Prior Art

In this type of large vehicle, i.e., a vehicle in which the weight of a steering axle is especially large, the construction of the power steering system is such that a hydraulic pump and a power cylinder need to be large in order to secure stationary swing capability at the time when the vehicle is at a standstill as well as the steering power required during extremely low-speed running of the vehicle.

On the other hand, however, this means that the load imposed on the engine when the hydraulic pump is driven becomes extremely large, and a large load is applied to the engine even during high-speed running when the hydraulic pump is not required to exhibit a large supplying capability for the hydraulic pump. Thus, the power consumption efficiency has tended to be low.

SUMMARY OF THE INVENTION

Accordingly, it is a primary object of the present invention to provide a power steering system for use in a large vehicle which is capable of controlling wasteful consumption of the power generated by an engine, of improving the fuel consumption of the engine, and of lightening the burden felt by a driver during stationary swing of a steering wheel while the vehicle is at a standstill. This object is accomplished by the provision of a hydraulic pump which need not be large in size, and by reducing the size of a pressure-receiving surface of a piston in a power cylinder.

It is a further object of the present invention to provide a power steering system for use in a large vehicle which is capable of mitigating driver fatigue resulting from manual steering by varying the steering power in response to speed and load during running.

To this end, the present invention provides a power steering system for use in a large vehicle, comprising: a main booster for steering a pair of steering knuckle spindles swingably connected to opposite ends of an axle; an auxiliary booster for compensating the steering power of the main booster; a main hydraulic line for connecting the main booster to the hydraulic pump; an auxiliary hydraulic line branching off from the main hydraulic line and connecting the auxiliary booster to the hydraulic pump; a control valve disposed in the main hydraulic line for connecting the main and auxiliary boosters to the hydraulic pump and having a pump port, a tank port, a pair of power cylinder ports which are interchangeably connected to the pump and tank ports, and a reaction pressure supply port and a reaction pressure relief port each communicating with the reaction chamber; a reaction pressure supply passage for connecting the delivery side of the hydraulic pump to the reaction pressure supply port of the control valve; a reaction pressure supply-side variable throttle disposed in the reaction pressure supply passage; a reaction pressure relief passage for connecting the suction side of the hydraulic pump to the reaction pressure relief port of the control valve; a reaction pressure relief-side variable throttle disposed in the reaction pressure relief passage; a controller for opening and closing the reaction pressure supply-side and reaction pressure relief-side variable throttles in response to a signal transmitted from a vehicle speed sensor; and a load sensing valve disposed in the auxiliary hydraulic line and operable to be changed over in response to the load of the main booster, whereby the variable throttles are opened and closed by the controller in response to the vehicle speed to control the flow rate of hydraulic oil flowing through the control valve due to a hydraulic reaction force, and, at that time, when the load applied to the main booster is small, the hydraulic pressure of the main booster is set to a low level, and the load sensing valve is closed to drive only the main booster, while, when the load apploied to the main booster becomes large, the hydraulic pressure of the main booster is set to a high level, and the load sensing valve is opened to drive the auxiliary booster in an interlinking relationship with the main booster so as to compensate the steering power of the main booster, thereby to be provided with speed-responsive and load-responsive characteristics.

DESCRIPTION OF THE PREFERRED EMBODIMENTS

Hereinafter, description will be made of preferred embodiments of a power steering system for use in a large vehicle in accordance with the present invention with reference to the accompanying drawings.

FIGS. 1 to 4 illustrate an embodiment of a power steering system for use in a large vehicle which is applied to a twin steer truck 130 in accordance to with the present invention.

Figure 1:
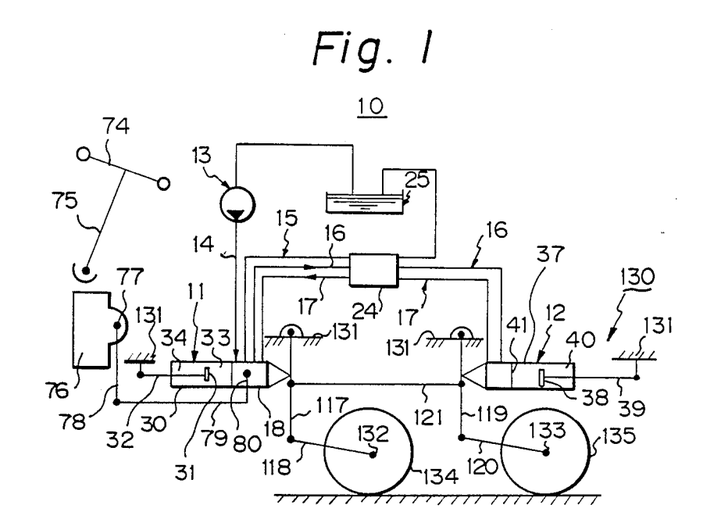
FIG. 1 is a schematic diagram illustrating an embodiment of a power steering system for use in a large vehicle in accordance with the present invention, which is applied to a twin steer truck.

In the twin steer truck 130, this power steering system 10 steers a pair of steering knuckle spindles 132, 133 which are respectively connected swingably to the respective opposite ends of a first steering axle (not shown) and a second steering axle (not shown), the steering angle of which can be changed in a mutually interlocking relationship.

The power steering system 10 comprises the following: a main booster 11 for steering the steering knuckle spindle 132; an auxiliary booster 12 connected to the steering knuckle spindle 133 side such as to supplement the steering power of the main boster 11; a hydraulic pump 13; main hydraulic lines 14, 15 connecting the main booster 11 to the hydraulic pump 13; auxiliary hydraulic lines 16, 17 branching off from the main hydraulic lines 14, 15 and connecting the auxiliary booster 12 to the hydraulic pump 13; a control valve 18 which is disposed in the main hydraulic lines 14, 15, is controlled in response to input steering power, i.e., is operated by a steering wheel 74, changes over the flow of hydraulic oil supplied from the hydraulic pump 13 to the main and auxiliary boosters 11, 12, and changes the flow rate of the hydraulic oil; a reaction pressure supply passage 19 for the control valve 18; a reaction pressure supply-side variable throttle 20 disposed in the reaction pressure supply passage 19; a reaction pressure relief passage 21 for the control valve 18; a reaction pressure relief-side variable throttle 22 disposed in the reaction pressure relief passage 21; a controller 23 for opening and closing the reaction pressure supply-side and reaction pressure relief-side variable throttles 20, 22 in response to the vehicle speed; and a load sensing valve 24 operable to be changed over in response to the hydraulic pressure of the main booster 11. When the truck 130 is at a stop or being run at low speed, or when the load reaches a predetermined value or more, the load sensing valve 24 is opened, which in turn causes the auxiliary booster 12 to be interlocked with the main booster 11, and the steering power of the main booster 11 is compensated by the auxiliary booster 12 so as to lighten the manual steering. On the other hand, when the truck 130 is run under conditions other than those mentioned above, the load sensing valve 24 is closed, which in turn cuts off the auxiliary booster 12 from the main booster 11, and the hydraulic oil supplied to the auxiliary booster 12 is thereby allowed to escape to an oil reservoir 25. Then, the auxiliary booster 12 interlocked with the main booster 11 is released, and the main booster 11 alone is driven so as to make the manual steering heavy.

The main booster 11 is a hydraulic cylinder and comprises a cylinder 30; a piston 31 fitted reciprocatably in the cylinder 30 and partitioning the interior of the cylinder 30 into cylinder chambers 33, 34; and a piston rod 32 one end of which is fixed to the piston 31 and the other end of which is pivotally connected to a chassis 131, the other end portion thereof being capable of being inserted into the cylinder 30 and retracted therefrom. The control valve 18 is incorporated in a body of the cylinder 30. In this embodiment, the main booster 11 has its own linkage system as described below. The main booster 11 is thereby interrelated to the power steering system in a linkage form.

The main booster 11 has its cylinder 30 pivotally connected to an idle arm 117 for the steering knuckle spindle 132 and connected to an idle arm 119 for the steering knuckle spindle 133 via a relay rod 121.

Since the idle arm 117 disposed frontwardly thereof is, at the upper end thereof, connected rotatably with the chassis 131, and is, at the lower end thereof, connected rotatably with a truck link 118, said truck link 118 being connected rotatably with a knuckle arm (not shown) of a knuckle (not shown) for rotatably connecting the steering knuckle spindle to the first steering axle, the idle arm 117 is rotated by the main booster 11 in the longitudinal direction of the truck 130 relative to the chassis 131 with a pivotally connected portion at the upper end thereof as a fulcrum, thereby changing the steering angle of the steering knuckle spindle 132, i.e., the first steering axle 134 rotatably supported by the steering knuckle spindle 132.

The knuckle having the steering knuckle spindle 132 and rotatably connecting the same to the first steering axle is of course similar to the sort used in an existing truck of this type. These knuckles are each arranged substantially in the shape of a letter L with the knuckle arm and a tie-rod arm (not shown), and are connected rotatably to the opposite ends of the first steering axle via king pins (not shown), respectively.

A tie rod (not shown) is connected rotatably between the tie-rod arms of the pair of knuckles connected rotatably to the opposite ends of the first steering axle.

On the other hand, the rear idle arm 119 is, at the upper end thereof, connected rotatably to the chassis 131 and is, at the lower end thereof, connected rotatably to the truck link 120, the rear truck link 120 being connected rotatably to a knuckle arm (not shown) of a knuckle (not shown) for rotatably connecting the steering knuckle spindle 133 to the second steering axle, as in the case of the front idle arm 117. Therefore, the rear idle arm 119 is rotated by the main booster 11 in the longitudinal direction of the truck 130 relative to the chassis 131 with a pivotally connected portion at the upper end thereof as a fulcrum via the front idle arm 117 and a relay rod 121 thereby changing the steering angle of the steering knuckle spindle 133, i.e., the second steering axle 136 rotatably supported by the steering knuckle spindle 133.

As in the case of the knuckles for the aforementioned steering knuckle spindle 132, these knuckles for the steering knuckle spindle 133, arranged substantially in the shape of a letter L, are each provided with the knuckle arm and a tie-rod arm (not shown) and are rotatably connected to the opposite ends of the second steering axle via king pins (not shown), respectively.

In addition, a tie rod (not shown) is connected rotatably between the tie-rod arms of the pair of knuckles connected rotatably to the opposite ends of the steering knuckle spindle 133.

Accordingly, if the main booster 11 is driven, and the front and rear idle arms 117, 119 are interlocked with the relay rod 121 and are swung in the longitudinal direction relative to the chassis 131 via the front and rear truck links 118 and 120, the front and rear knuckles are respectively rotated about the corresponding king pins of the first and second steering axles, with the result that the steering knuckle spindles 132, 133, i.e., the first and second wheels 134, 135 are steered synchronously.

The auxiliary booster 12 is arranged such that it is connected to the steering knuckle spindle 133 side of the second steering axle 135 such as to compensate the steering power of the main booster 11 and is driven by the hydraulic oil delivered from the hydraulic pump 13 via the control valve 18 in conjunction with the operation of the load sensing valve 24 in such manner as to be interlinked with the main booster 11. Thus the auxiliary booster 12 is also connected to the power steering system in a linkage form, as described below.

The auxiliary booster 12 is a hydraulic cylinder similar to the main booster 11 and comprises a cylinder 37; a piston 38 fitted reciprocably in the cylinder 37 and partitioning the interior of the cylinder 37 into cylinder chambers 40, 41; and a piston rod 39 one end of which is fixed to the piston 38 and the other end of which is capable of being inserted into the cylinder 37 and retracted therefrom. The cylinder 37 is pivotally connected to the idle arm 119, and the other end of the piston rod 39 to the chassis 131, respectively.

Accordingly, when the auxiliary booster 12 is driven, and the rear idle arm 119 is thereby swung in the longitudinal direction relative to the chassis 131 via the rear truck link 120, the knuckle is rotated about the king pin of the second steering axle, and the steering knuckle spindle 133, i.e., the second wheel 135, is steered. At that juncture, the steering power of the auxiliary booster 12 is of course transmitted to the front idle arm 117 via the relay rod 121, and causes the idle arm 117 to be swung in the longitudinal direction of the chassis 131 via the front truck link 118, which in turn causes the front knuckle to rotate about the king pin of the first steering axle, thereby steering the steering knuckle spindle 132, i.e., the first wheel 134.

Thus, the auxiliary booster 12 synchronously compensates the steering power of the main booster 11.

The hydraulic pump 13 is driven by an engine (not shown) mounted in the truck 130 and generates hydraulic pressure for driving the main and auxiliary boosters 11, 12. As for the hydraulic pump 13, its supplying capability is established on the basis of the output of the main booster 11 alone just as the supplying capability of a conventional hydraulic pump is established on the basis of the output of a booster. Since the hydraulic pump 13 is fabricated with a substantially identical structure as that of a hydraulic pump used in a conventional power steering system, description of an arrangement thereof will be omitted.

The main hydraulic lines 14, 15 serve to connect the main booster 11, hydraulic pump 13, control valve 18, and oil reservoir 25 to a main hydraulic oil circuit. The main hydraulic line 14 is a supply-side hydraulic line, and is arranged such that the hydraulic pump 13 is connected to the control valve 18 which is connected to the main booster 11, and the oil reservoir 25 is connected to the hydraulic pump 13, thereby making it possible to supply to the main booster 11 the hydraulic oil the flow rate of which has been controlled by the control valve 18.

On the other hand, the main hydraulic line 15 is a return-side hydraulic line and is arranged such that the oil reservoir 25 is connected to the control valve 18, the hydraulic oil is returned to the reservoir 25 from the main booster 11, the load sensing valve 24 being disposed in the midway thereof, thereby making it possible to return the hydraulic oil of the auxiliary booster 12 to the oil reservoir 25.

The auxiliary hydraulic lines 16, 17 branch off from the main hydraulic lines 14, 15 and connect the the auxiliary booster 12 to the main booster 11, so as to synchronize the auxiliary booster 12 with the main booster 11. The auxiliary hydraulic lines 16, 17 are for turning to the left and the right, respectively.

The auxiliary hydraulic lines 16, 17 branch off from communicating passages 44, 45 which constitute parts of the main hydraulic lines 14, 15, connect the auxiliary booster to the hydraulic pump 13, supplies to the auxiliary booster 12 the hydraulic oil which has been supplied from the hydraulic pump 13 and the direction and the flow rate of which have been controlled by the control valve 18, makes the auxiliary booster 12 driveable synchronously with the main booster 11, and returns the hydraulic oil from the auxiliary booster 12 to the oil reservoir.

Figure 2:
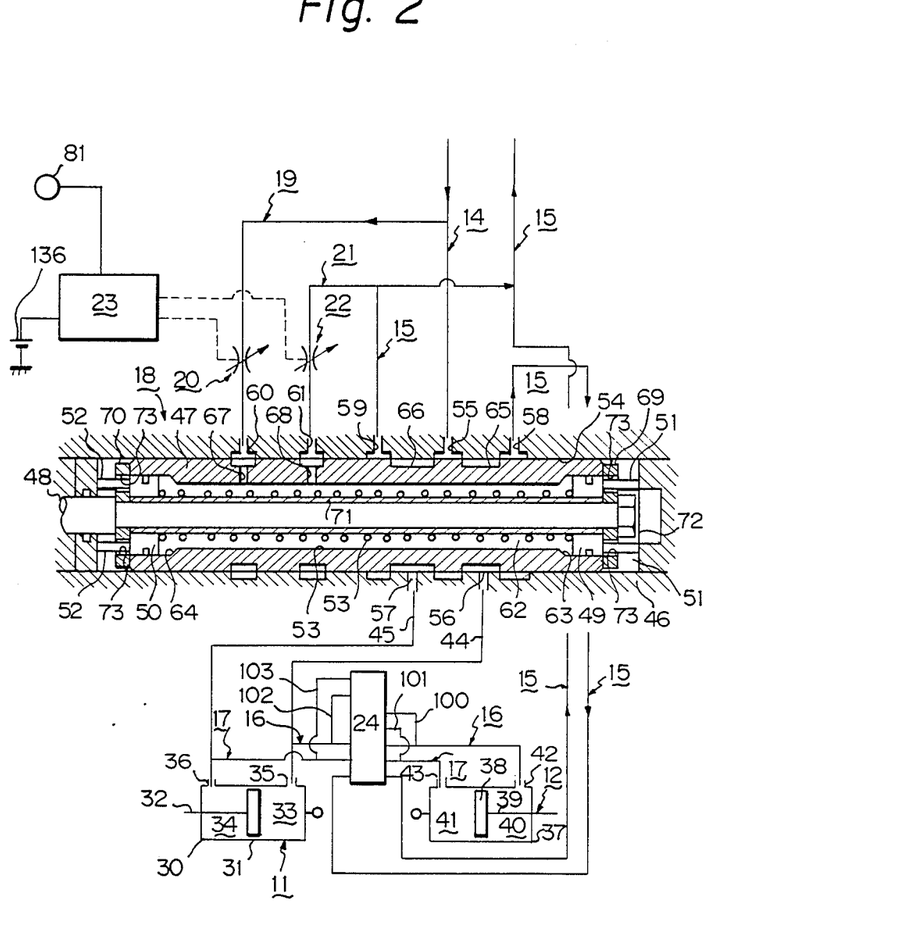
FIG. 2 is a schematic diagram of a hydraulic circuit, sectioned at a control valve, of the power steering system shown in FIG. 1.

The control valve 18 has the structure of a hydraulic reaction force-type spool valve, and is so arranged to be incorporated into a body of the cylinder 30 of the main booster 30 and to be controlled by the steering wheel 74. In the main hydraulic circuit, the control valve 18 is disposed in the main hydraulic lines 14, 15 for connecting the hydraulic pump 13 and the oil reserver 25 to the main booster 11 as well as in the communicating passages 44, 45. The control valve 18 controls the direction of the hydraulic oil sent from the hydraulic pump 13 and supplies the same to the main booster 11. Furthermore, the control valve 18 controls the direction of the hydraulic oil operated in the main booster 11, and returns the hydraulic oil to the oil reservoir which is located on the suction side of the hydraulic pressure pump 13. Moreover, the control valve 18 supplies to the auxiliary booster 12 the hydraulic oil sent from the hydraulic pump 13.

As can be appreciated from FIG. 2, the control valve 18 comprises a valve body 46, a hollow spool 47, a spool shaft 48, a pair of reaction pistons 49, 50, a pair of reaction piston stoppers 51, 52, and a reaction spring 53.

The valve body 46, in which a valve bore 54 is formed, is incorporated in the cylinder 30 of the main booster 11 and has at its predetermined positions a pump port 55 which is open in the valve bore 54, a pair of cylinder ports 56, 57, a reaction pressure supply port 60, and a reaction pressure relief port 61.

The pump port 55, cylinder ports 56, 57, tank ports 58, 59, reaction pressure supply port 60, and reaction pressure relief port 61 respectively form in openings in the form of annular grooves in the inner peripheral surface of the valve bore 54.

In addition, the following arrangement is made in this control valve 18 in order to supply the hydraulic oil, sent from the hydraulic pump 13, to the cylinder chambers 33, 34 of the main booster 11 and the cylinder chambers 40, 41 of the auxiliary booster. The pump port 55 is connected to a delivery port of the hydraulic pump 13 by means of the main hydraulic line 14. The cylinder ports 56, 57 are respectively connected to oil ports 35, 36 of the main booster by means of the communicating passages 44, 45, and to oil ports 42, 43 of the auxiliary ports 12 by means of the auxiliary hydraulic lines 16, 17 branching off from the communicating passages 44, 45. Moreover, the tank ports 58, 59 are connected to the oil reservoir 25 by means of the main hydraulic line 15.

Furthermore, in this control valve 18, in order to adjust the reactionary force of the hydraulic pressure, the reaction pressure supply port 60 is connected to the main hydraulic line 14 via the reaction pressure supply passage 19, and the reaction pressure relief port 61 is connected to the main hydraulic line 15 via the reaction pressure relief passage 21. Needless to say, the reaction pressure supply passage 19 is connected to the main hydraulic line 14 on the delivery port side of the hydraulic pump 13, while the reaction pressure relief passage 21 is connected to the main hydraulic line 15 on the oil reservoir 25 side.

The hollow spool 47 is reciprocatably placed in the valve bore 54 formed in the valve body, and the inner side thereof is formed as a reaction chamber 62.

In addition, the hollow spool 47 has piston bores 63, 64 respectively formed at the opposite ends of the reaction chamber 62 such as to radially expand the inner peripheral surface thereof. Furthermore, the hollow spool 47 has on the outer peripheral surface thereof annular grooves 65, 66 for forming spool oil chambers for changing over a pump port 55 and tank ports 58, 59 formed in the valve body 54 so as to be connected to the cylinder ports 56, 57, respectively.

Moreover, the hollow spool 47 has a reaction pressure supply-side communicating port 67 for connecting the reaction chamber 62 to the reaction pressure supply port 60 as well as a reaction pressure relief-side communicating port 68 for connecting the reaction chamber 62 to the reaction pressure relief port 61.

The spool shaft 48 has one end portion thereof inserted into the hollow spool 47 and is located at both ends of the spool 47 such as to reciprocatably slide the spool 47 in the valve bore 54. The spool shaft 48 further has a pair of spool stoppers 69, 70 for fixing the spool 47 and has its other end coupled with an input shaft 80.

A further description will be made of the structure of fixing the spool 47. The spool shaft 48 fixes the spool 47 which is clamped by the pair of spool stoppers 69, 70, which are fixed to one end of the spool shaft 48 at an interval therebetween, by means of a sleeve-like spacer 71 fitted to one end of the spool shaft 48 as well as a nut 72 screwed into one end of the spool shaft 48, so that the spool shaft 48 is located between the spool stoppers 69, 70.

The spool stoppers 69, 70 are formed in the shape of a plate, and each have two small openings 73 in the stopper surface at predetermined positions at a predetermined interval.

The reaction pistons 49, 50 are reciprocatably fitted around the spacer 71 and in the piston bores 63, 64, and close the reaction chamber 62 formed in the hollow spool 47.

The reaction piston stoppers 51, 52 are respectively constituted by two pins projecting from the respective inner end surfaces of the valve bore 54. The pins 51, 52 penetrating through the small openings 73 of the spool stoppers 69, 70, cause their tips to abut against the corresponding reaction pistons 49, 50, thereby restricting the movement of the reaction pistons 49, 50 in the direction toward the inner end surfaces of the valve bore 54. In conjunction with the movement of the spool shaft 48, the pins 51, 52 provide a pumping operation to the reaction pistons 49, 50 in cooperation with the reaction spring 53, thereby compresses the oil filled in the reaction chamber 62 to vary the reaction force of the hydraulic pressure sensed by the spool shaft 48.

The reaction spring 53, disposed around the spacer 71 on the spool shaft 48 at a location the reaction pistons 49, 50, is adapted to impart a pumping operation to the reaction pistons 49, 50 and functions as a neutral spring for the valve.

In order for this control valve 18 to be operated by the steering wheel 74, the arrangement is made as follows. The spool shaft 48 is connected to the steering wheel 74 by means of the steering shaft 75 with the steering wheel 74 mounted thereon, a steering gear box 76 connected to the steering shaft 75, a pitman arm 78 secured to a sector shaft 77 of the stearing gear box 76, and a compensating rod 79 which connects the pitman arm 78 to the input shaft 80. The movement of the steering wheel 74 is made transmissible to the spool shaft 48, and the hollow spool 47 is reciprocatably slided in the valve bore 54 by the input manual steering power using the steering wheel 74.

The reaction pressure supply passage 19 is formed in the valve body 46 of the control valve 18. One end of the reaction pressure supply passage 19 is connected to the main hydraulic line 14 on the delivery side of the hydraulic pump 13, and the other end thereof to the reaction pressure supply port 60 of the control valve 18, thereby allowing the hydraulic oil delivered from the hydraulic pump 13 to be supplied to the reaction chamber 62 of the control valve 18. It goes without saying that the reaction pressure supply passage 19 may be arranged as a line.

The reaction pressure supply-side variable throttle 20 is arrange so as to be opened and closed by an electric actuator (not shown) and to change the sectional area of the passage. This variable throttle 20 is disposed in the reaction pressure supply passage 19, shuts off the hydraulic oil flowing from the hydraulic pump 13 into the reaction chamber 62 of the control valve 18, and makes it possible to adjust the flow rate of the hydraulic oil.

The reaction pressure relief passage 21 is formed in the valve body 46 of the control valve 18. One end of this passage 21 is connected to the reaction pressure relief port 61 of the control valve 18, and the other end thereof to the main hydraulic line 15 on the oil reservoir 25 side, thereby allowing the hydraulic oil in the reaction chamber 62 of the control valve 18 to escape to the oil reservoir 25. It goes without saying that the reaction pressure relief passage 21 may be arranged as a line, as in the case of the reaction pressure supply pasage 19.

The reaction pressure relief-side variable throttle 22, as in the case of the reaction pressure supply-side variable throttle 20, is arranged so as to be opened and closed by an electric actuator (not shown) and to change the sectional area of the passage. This variable throttle 22 is disposed in the reaction pressure relief passage 21, shuts off the hydraulic oil flowing from the reaction chamber 62 of the control valve 18 into the oil reservoir 25, and makes it possible to adjust the flow rate of the hydraulic oil.

The controller 23 electrically connects the input side thereof to a vehicle speed sensor 81 and the output side thereof to the electric actuators of the variable throttles, 20, 22, and, in response to a signal from the vehicle speed sensor 81, i.e., the vehicle speed sensed by the sensor 81, controls an electric current flowing through the electric actuators so as to open and close the variable throttles 20, 22 and to change the sectional area of the passages. The controller 23 is mainly composed of input and output circuits, memory circuit, arithmetic circuit, control circuit, and power supply circuit, a battery 136 of the truck being used commonly for the power supply circuit.

The vehicle sensor 81 is for detecting the traveling speed of the truck 130, and is disposed on the output shaft of a gearbox unit (not shown) installed in the truck 130.

The load sensing valves 24 are parts of the main hydraulic lines 14, 15, and are disposed in the auxiliary hydraulic lines 16, 17 branching off from the communicating passages 44, 45 for connecting the control valve 18 to the main boster 11, as well as in the main hydraulic line 15 disposed between the control valve 18 and the oil reservoir 25. The load sensing valves 24 have the structure shown in FIGS. 3 and 4 and are arranged so as to be opened and closed in response to the level of the hydraulic pressure generated by the cylinder 30 of the main booster 11, which corresponds to the load of the truck 30.

Figure 3:
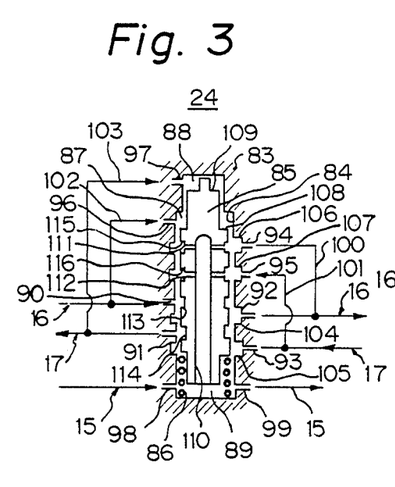
FIG. 3 is a vertical cross-sectional view of a road sensing valve used in the power steering system shown in FIG. 1, the hydraulic oil in the main booster of the power steering system being at a low level.
Figure 4:
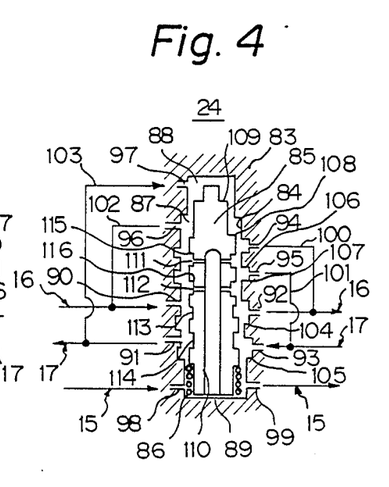
FIG. 4 is a vertical cross-sectional view of the load sensing valve shown in FIG. 3, the hydraulic oil in the main booster being at a high level.

As can be appreciated from FIGS. 3 and 4, the load sensing valve 24 comprises a valve body 83 having a valve bore 84 formed in the inside thereof, a spool 85 reciprocatably disposed in the valve bore 84, and a set pressure spring 86.

The valve body 83 has the valve bore 84 formed in the inside thereof, in which left- and right-turn control pressure chambers 87, 88 are formed in one end portion thereof in cooperation with the spool 85, and an oil receiving chamber 89 is formed in the other end portion of the valve bore 84 in cooperation with the spool 85.

In addition, the valve body 83 has in its predetermined positions a pair of control valve ports 90, 91 which are open to the valve bore 84, a pair of cylinder ports 92, 93, and a pair of tank lead ports 94, 95. The valve body 83 further has pressure lead ports 96, 97 which are open to the left- and right-turn control pressure chambers 87, 88 and a pair of tank ports 98, 99 which are open to the oil receiving chamber 89.

The control valve ports 90, 91 connect the auxiliary hydraulic lines 16, 17, and are connected to the cylinder ports 56, 57 of the control valve 18 via the auxiliary hydraulic lines 16, 17, respectively. The cylinder ports 56, 57, in turn, connect the auxiliary hydraulic lines 16, 17 and are connected to the oil ports 42, 43 of the auxiliary booster 12 via the auxiliary hydraulic lines 16, 17. If the spool 85 is driven by the hydraulic pressure of the main booster 11, the hydraulic pressure controlled by the control valve 18 can be selectively supplied to the cylinder chambers 40, 41 of the auxiliary booster 12.

The tank lead ports 94, 95 connect on the auxiliary booster 12 side thereof return lines 100, 101 branching off from the auxiliary hydraulic lines 16, 17, and are connected to the oil ports 42, 43 of the auxiliary booster 12 via the return lines 100, 101. If the spool 85 is driven by the hydraulic pressure of the main booster 11, the tank lead poorts 94, 95, hence, allow the hydraulic oil in the cylinder chambers 40, 41 of the auxiliary booster 12 to be selectively returned to the oil reservoir 25.

Furthermore, the pressure lead ports 96, 97 connect on the main booster 11 and the control valve 18 sides thereof control pressure lead lines 102, 103 branching off from the auxiliary hydraulic lines 16, 17 and are connected to the oil ports 35, 36 of the main booster 11 and the cylinder ports 56, 57 of the control vlve 18 via the control pressure lead lines 102, 103. Thus, the pressure lead ports 96, 97 allow the hydraulic oil of the main booster 11 to be led into the corresponding left- and right-turn control pressure chambers 87, 88.

In addition, the tank ports 98, 99 connect the main hydraulic line 15 and allow the hydraulic oil flowing from the main booster 11 and the auxiliary booster 12 to be returned to the oil reservoir 25 through the main hydraulic line 15 via the oil receiving chamber 89.

The cylinder ports 92, 93 and the tank lead ports 94, 95 respectively have annular grooves 104, 105, 106, and 107, which are open to the inner peripheral surface of the valve bore 84.

The spool 85 has left- and right-turn pressure-receiving surfaces 108, 109 formed at one end poortion thereof in correspondence with the left- and right-turn control pressure chambers 87, 88, as well as a communicating hole 110 bored by a drill and open to the end surface of the other end thereof.

In addition, the spool 85 has communicating ports 111, 112 for the communicating hole 110 to be connected or disconnected with the tank lead ports 94, 95 in response to its own movement.

Moreover, in this spool 85, spool grooves 113, 114, 115, and 116 associated with the annular grooves 104, 105, 106, and 107, which are openings of the cylinder ports 92, 93 and the tank ports 98, 99 on the inner peripheral surface of the valve bore 84, are formed on the outer peripheral surface thereof at predetermined intervals. In particular, the spool grooves 115, 115 are communicated with the communicating hole 110.

The set pressure spring 86, which is constituted by a coil spring, is disposed in the oil receiving chamber 89 and biases the spool 85 against one end of the valve bore 84.

Next, description will be made of the operation of the above-described power steering system 10 in correspondence with the running conditions of the twin steer truck 130. Since the diesel engine is operative, the hydraulic pump 13 is driven, and the hydraulic oil delivered from the hydraulic pump 13 flows through the main hydraulic line 14 and is supplied to the pump port 55 of the control valve 18.

If the hollow spool 47 is placed in the neutral position shown in FIG. 2, the hydraulic oil supplied to the pump port 55 flows from the pump port 55 to the tank ports 58, 59, and is returned to the oil reservoir 25 via the main hydraulic line 15 and via the oil receiving chamber 89 of the load sensing valve 24 connected in the midway of the main hydraulic line 15. However, if the steering wheel 74 is steered and the spool shaft 48 is consequently moved in either direction via the steering shaft 75, steering gear box 76, pitman arm 78, compensating rod 79, and input shaft 80, and if the hollow spool 47 slides in the direction of the movement of the spool shaft 48, the hydraulic oil is sent to either the cylinder chamber 40 or 41 of the main booster 11 via either the comminicating passage 44 or 45 in response to the movement of the hollow spool 47. At the same time, the hydraulic oil flows to either one of the auxiliary hydraulic lines 16, 17 corresponding to the communicating passages 44, 45, and is supplied to either the cylinder chamber 40 or 41 of the auxiliary booster 12 corresponding to the cylinder chambers 33, 34 of the main booster 11 in response to the opening operation of the load sensing valve 24.

At the same time, the control valve 18 inputs a signal transmitted from the vehicle speed sensor 81 to control an electric current flowing through the electric actuators of the variable throttles 20, 22, changes the pressure inside the reaction chamber 62 of the control valve, thereby assuming a state for obtaining a reaction force of the hydraulic oil suited to the vehicle speed.

Description will now be made of cases where an operation of steering for stationary swing or steering sharply to the left and the right while moving back and forth is carried out under the conditions in which the truck 130 is loaded with a cargo and is at a standstill.

Since the truck 130 is at a stop, the controller 23 receives a signal from the vehicle sensor 81, makes comparison and carries out an arithmetic operation on the basis of the input signal, detemines an output signal, i.e., an output electric current, and supplies the output electric current to the electric actuators of the reaction pressure supply-side and reaction pressure relief-side variable throttles 20, 22. Consequently, the reaction pressure relief-side varible throttle 22 is opened, while the reaction pressure supply-side variable throttle 20 is closed. Thus, the condition is such that hydraulic pressure is not generated, i.e., the manual steering power is light.

Accordingly, the hydraulic oil inside the reaction chamber 62 of the control valve 8 is returned to the oil reservoir 25 via the reaction pressure relief-side communicating port 68, reaction pressure relief port 61, reaction pressure relief passage 21, and main hydraulic line 15. At the same time, since part of the hydraulic oil delivered from the hydraulic pump 13 is not supplied to the reaction chamber 62 of the control valve 18 via the main hydraulic line 14, reaction pressure supply passage 19, reaction pressure supply port 60, and reaction pressure supply-side communicting port 67, the hydraulic pressure inside the reaction chamber 62 is in such a state that the steering wheel 74 can be steered lightly while the truck 130 is at a standstill.

In that state, if the steering wheel is manually steered, and the operating force of the steering wheel 74 is transmitted to the spool shaft 48 of the control valve 18 via the steering shaft 75, steering gear box 76, pitman arm 78, compensating rod 79, and input shaft 80, and if the hollow spool 47 in the control valve 18 is slid in either direction, the pump port 55 in the control valve 18 is communicated with either the cylinder port 56 or 57. Consequently, the hydraulic oil supplied from the hydraulic port 13 is sent to either the communicating passage 44 or 45, and is supplied to either the corresponding cylinder chamber 33 or 34 of the main booster 11. At the same time, in the load sensing valve 24, the hydraulic oil flowing to either the auxiliary hydraulic line 16 or 17 is supplied to either the corresponding left- or right-turn control pressure chamber 87, 88 via either the control pressure lead line 102 or 103. Subsequently, as shown in FIG. 4, the hydraulic oil depresses the spool 85 inside the valve bore 84 in opposition to the set pressure spring 86 to allow the control valve ports 90, 91 to be communicated with the cylinder ports 92, 93. At that juncture, the tank lead ports 94, 95 are closed by the spool 85. As a result, in the auxiliary booster 12 as well, the hydraulic oil is supplied to either the cylinder chamber 40, or 41 in correspondence with the main booster 11.

Needless to say, the hydraulic oil in the other cylinder chambers each of the cylinder chambers 33, 34 and 40, 41 of the cylinders 30, 37 of the main and auxiliary boosters 11, 12 is returned from the main hydraulic pressure line 15 to the oil reservoir via the oil receiving chamber 89 of the load sensing valve 24.

Accordingly, the main and auxiliary boosters 11, 12 are driven synchronously by the hydraulic oil supplied from the hydraulic pump 13, and the first wheel 134 and the second wheel 135 are steered synchornously. At that juncture, since an appropriate reaction force of the hydraulic oil is obtained for the reaction chamber 62 of the control valve 18, steering for stationary swing and steering sharply to the left and the right while moving back and forth are effected smoothly with an appropriate operating manual force, i.e., a very small operating manual force.

In addition, when the truck 130 is run at a very slow speed, the main and auxiliary boosters 11, 12 are driven synchronously by the hydraulic oil supplied from the hydraulic pump 13, so that steering can be carried out with a very small operating manual force.

At such time when the truck 130 is at a standstill or being run at a very low speed, a sudden steering operation is not required, and even if the amount of the hydraulic oil being delivered by the hydraulic pump 13 is relatively small, the main and auxiliary boosters 11, 12 can be driven sufficiently. Accordingly, there is no need to make the hydraulic pump 13 large, the steering of the main and auxiliary boosters 11, 12 becomes possible, and the load of the engine which drives the hydraulic pump 13 can be minimized, with the result that the fuel consumption of the engine can be improved.

Next, description will be made of a case where the speed of the truck 130 is increased from the very low speed and normal running is carried out.

The controller 23 receives a signal from the vehicle sensor 81, makes comparison and carries out an arithmetic operation on the basis of the input signal, determines an output electric current, and provides the output electric current to the electric actuators of the reaction pressure supply-side variable throttle 20 and the reaction pressure relief-side variable throttle 22. Consequently, the reaction pressure supply-side variable throttle 20 is opened, while the reaction pressure relief-side variable throttle 20 is closed. In addition, the reaction pressure supply-side variable throttle 20 is adjusted to have a sectional area of the passage corresponding to the vehicle speed at that time.

Accordingly, the hydraulic oil leaks from the reaction chamber 62 of the control valve 18 to the oil reservoir 25 via the reaction pressure relief-side communicating port 68, reaction pressure relief port 61, reaction pressure relief passage 21, and main hydraulic line 15, and the amount of relief of the hydraulic oil is decreased with an increase in the speed of the truck 130. At the same time, the hydraulic oil sent from the hydraulic pump 13 is supplied to the reaction chamber 62 of the control valve 18, and the amount of the hydraulic oil supplied increases. Consequently, the reaction force of the hydraulic pressure inside the reaction chamber 62 is gradually increased, so that, during high-speed running, a reaction force of the hydraulic oil is obtained for the reaction chamber 62, so that manual steering becomes heavy in response to an increase in the vehicle speed.

If the steering wheel 74 is operated in that state, the operational force of the steering wheel 74 is transmitted to the spool shaft 48 of the control vavle 18, and if the hollow spool 47 in the control valve 18 is slided in either direction, the pump port 55 in the control valve 18 is communicated with either the cylinder port 56 or 57. Consequently, the hydraulic oil sent delivered from the hydraulic pump 13 flows to either the communicating passage 44 or 45, and is supplied to either the cylinder chamber 33 or 34 of the cylinder 30 of the main booster 11. At the same time, in the load sending valve 24, the hydraulic oil flowing to either the auxiliary hydraulic line 16 or 17 is supplied to either of the corresponding left- and right-turn control pressure chambers 87 and 88 via either the control pressure lead line 102 or 103. However, since the load is small, the pressure of the hydraulic oil is low, so that the spool 85 in the load sensing valve 24 is not depressed in the valve bore 84 and is maintained in a state in which it is pushed upwardly inside the valve bore 84 by the set pressure spring 86. Communication between the control valve ports 90, 91 and the cylinder ports 92, 93 is cut off by the spool 85. On the other hand, the tank poorts 94, 95 are communicated with the oil receiving chamber 89 through the communicating hole 110 of the spool 85. As a result, the hydraulic oil is not supplied to the auxiliary booster 12. Meanwhile, the auxiliary booster 12 is communicated with the oil reservoir 25.

Thus, the hydraulic oil delivered from the hydraulic pump 13 is sent only to the main booster 11, and the auxiliary booster 12 assumes a free state.

Accordingly, steering during normal running is carried out by the main booster 11 alone, and the auxiliary booster 12 freely follows the steering of the main booster 11 without substantially resisting the steering by the main booster 11.

With respect to the flow control valve and the relief valve installed in the hydraulic circuit, a detailed description has been omitted from the above-described power steering system 10, and only a schematic description has been given.

In the above-described power steering 10, although the load sensing valve 24 is used in combination with the control valve 18 of the hydraulic reaction force type, the load sensing valve 24 may also be used in combination with a control valve of the spring reaction force type.

Figures 5, 6:
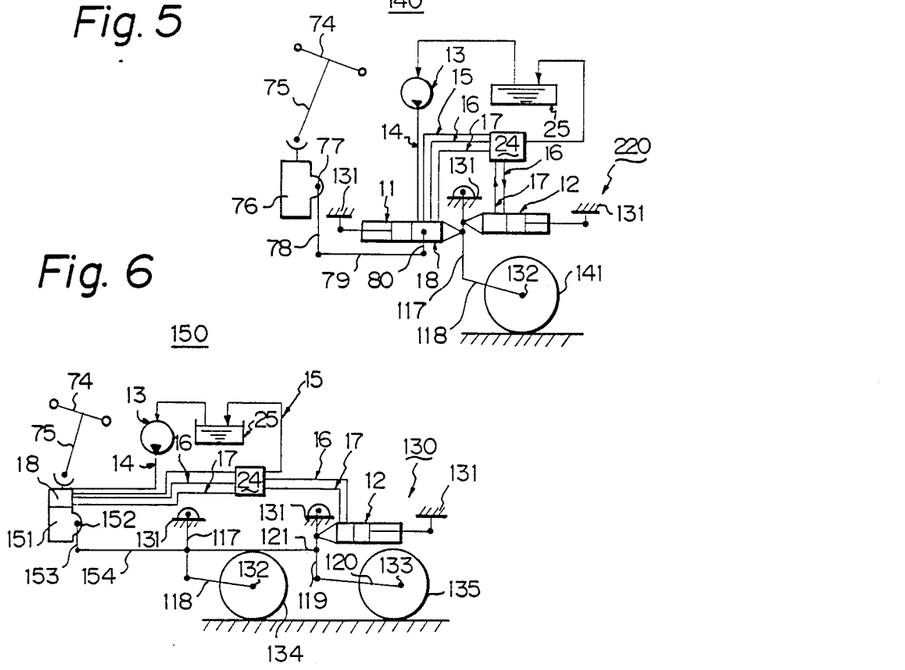
FIGS. 5 to 12 are schematic drawings illustrating other embodiments of a power steering system for use in a large vehicle in accordance with the present invention.

FIGS. 5 to 12 illustrate other embodiments 140, 150, 160, 170, 180, 190, 200 and 210 of the power steering system for use in a large vehicle in accordance with the present invention. The power steering system 140 shown in FIG. 5 is applied to a large truck 220 of the single steer type.

In this power steering system 140, the auxiliary booster 12 is pivotally connected to the idle arm 117 for a front axle 141.

The power steering system 150 shown in FIG. 6 is applied to a twin steer truck 130.

In this power steering system 150, a main booster 151 has an arrangement of the integral type, in which a pitman arm 153 fixed to a sector shaft 152 of the main booster 151 is connected to the idle arm 117 via the compensating rod 154.

Figure 7:
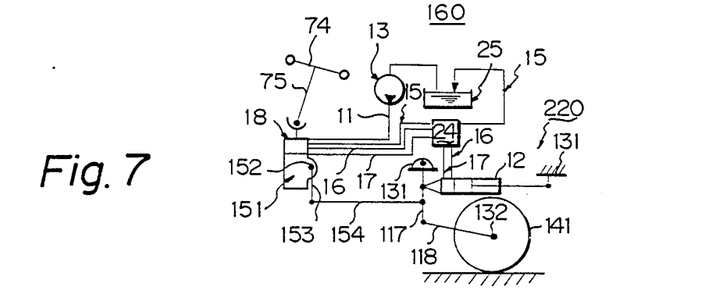

The power steering system 160 shown in FIG. 7 is applied to the large truck 220 of the single steer type.

This power steering system 160 is one in which the power steering system 150 shown in FIG. 6 has been modified to be applied to the large truck 220, and the auxliary booster 12 is pivotally connected to the idle arm 117.

Figures 8, 9:
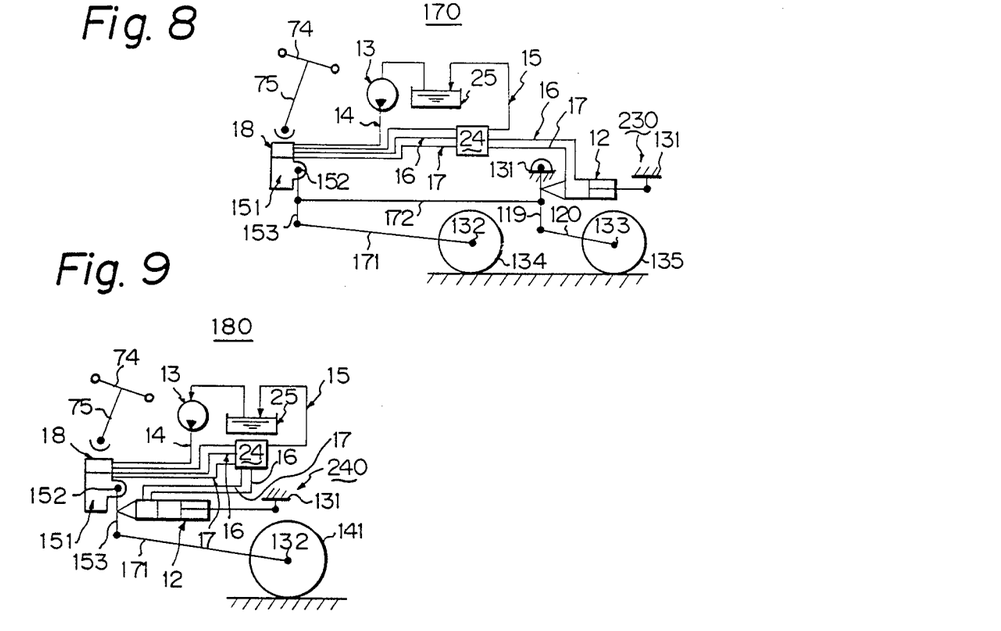

The power steering system 170 shown in FIG. 8 is applied to a twin steer truck 230.

This power steering system 170 is one in which the power steering system 150 shown in FIG. 6 has been made to be suited to the truck 230. In this power steering system 170, the truck link 171 for a first wheel 134 and a relay rod 172 for the for a second wheel 135 are connected to the pitman arm 153 secured to the sector shaft 152 of the main booster 151.

The power steering system 180 shown in FIG. 9 is applied to a large truck 240 of the single steer type.

This power steering is a modification of the power steering system 170 shown in FIG. 8 so as to be applied to the large truck 240, in which the auxiliary booster 12 is connected to the pitman arm 153 secured to the sector shaft 152 of the main booster 151.

Figure 10:
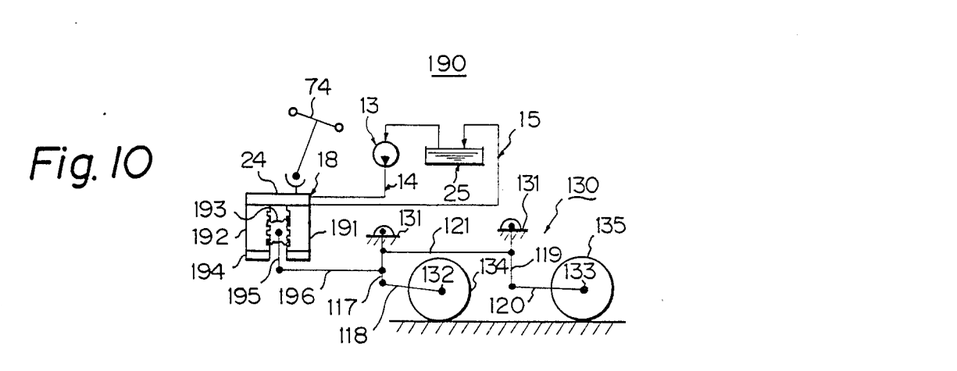

The power steering system 190 shown in FIG. 10 is applied to the twin steer truck 130.

This power steering system 190 is of the dual cylinder type, i.e., one in which the power cylinder is split into two portions for a main booster 191 and and an auxiliary booster 192. Specifically, the control valve 18 is incorporated in the main boster 191, and the load sensing valve 24 is interposed between the main booster 191 and the auxiliary booster 192, while the auxiliary hydraulic lines 16, 17 in the aforementioned power steering system 10 are incorporated in the cylinder bodies of the main and auxiliary boosters 191, 192.

In addition, in this power steering system 190, the pitman arm 195 secured to a sector shaft 194 of a sector gear 193 used commonly in the main booster 191 and the auxiliary booster 192 is connected to the idle arm 117 via a compensating rod 196.

Figure 11:
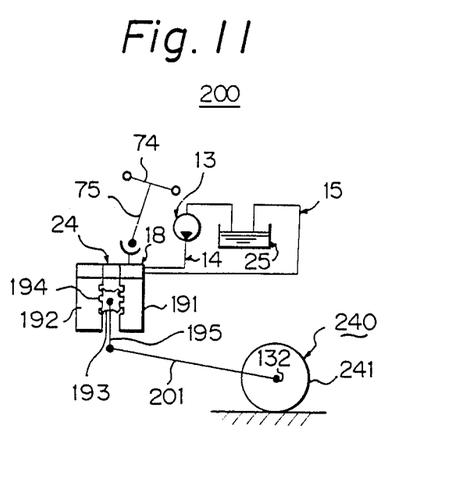

The power steering system 200 shown in FIG. 11 is applied to the large truck 240 of the single steer type.

This power steering system is one in which the power steering system 190 shown in FIG. 10 has been modified in correspondence with the truck 240, in which a truck link 201 for a front wheel 240 is connected the pitman arm 195.

Figure 12:
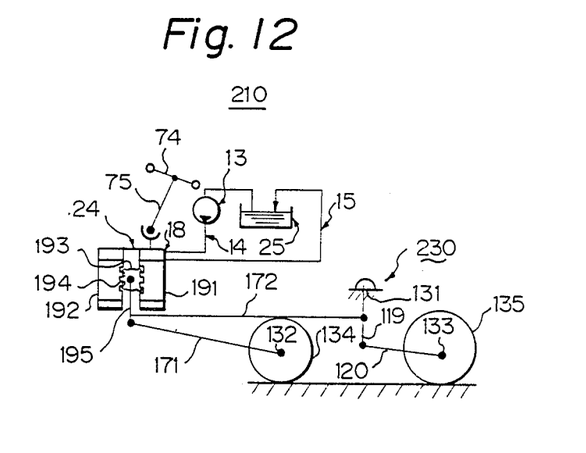

The power steering system 210 shown in FIG. 12 is applied to the twin steer truck 230.

This power steering 210 is one in which the power steering system shown in FIG. 10 has been modified in correspondence with the truck 230, in which the truck link 171 for the first wheel 134 and the realy rod 172 for the second wheel 135 are connected to the pitman arm 195 of the sector shaft 194 used commonly in the main booster 191 and the auxiliary booster 192.

As for the aforementioned power steering systems 140, 150, 160, 170, 180, 190, 200, and 210, the components of the same arrangement have been denoted by the same reference numerals, while the reference numerals of the power steering system 10 have been given to the components having arrangements corresponding to those of the power steering system 10, and description thereof has been omitted.

While the invention has been particularly shown and described with reference to preferred embodiments thereof, it will be understood by those skilled in the art that the foregoing and other changes and modifications in design can be made therein without departing from the spirit and scope of the invention.

What is claimed is:

1. A power steering system for use in a large vehicle, comprising:
   a main booster for steering a pair of steering knuckle spindles swingably connected to opposite ends of an axle;
   an auxiliary booster for compensating the steering power of said main booster;
   hydraulic pump means for supplying hydraulic oil;
   a main hydraulic line for connecting said main booster to said hydraulic pump;
   an auxiliary hydraulic line branching off from said main hydraulic line and connecting said auxiliary booster to said hydraulic pump;
   a control valve disposed in said main hydraulic line for connecting said main and auxiliary boosters to said hydraulic pump and having a reaction chamber, a pump port, a tank port, a pair of power cylinder ports which are interchangeably connected to said pump and tank ports, and a reaction pressure supply port and a reaction pressure relief port each communicating with said reaction chamber;
   a reaction pressure supply passage for connecting the delivery side of said hydraulic pump to said reaction pressure supply port of said control valve;
   a reaction pressure supply-side variable throttle disposed in said reaction pressure supply passage;
   a reaction pressure relief passage for connecting the suction side of said hydraulic pump to said reaction pressure relief port of said control valve;
   a reaction pressure relief-side variable throttle disposed in said reaction pressure relief passage;
   a controller for opening and closing said reaction pressure supply-side and reaction pressure relief-side variable throttles in response to a signal transmitted from a vehicle speed sensor; and
   a load sensing valve disposed in said auxiliary hydraulic line and operable to activate and deactivate said auxiliary booster in response to the load of said main booster.

2. A power steering system according to claim 1, wherein said control valve includes a valve body having a valve bore, the pump port which is open in said valve bore at a predetermined position, the pair of power cylinder ports, a pair of tank ports, the reaction pressure supply port, and the reaction pressure relief port; a hollow spool disposed reciprocatably in said valve bore of said valve body and having the reaction chamber formed inside thereof, a pair of piston bores formed at opposite ends of said reaction chamber, a reaction pressure supply-side communicating port for allowing said reaction pressure supply port to be communicated with said reaction chamber, and a reaction pressure relief-side communicating port for allowing said reaction pressure relief port to be communicated with said reaction chamber; a spool shaft penetrating said hollow spool and having a pair of spool stoppers disposed at both ends of said spool and adapted to fixedly connect said spool in such a manner as to allow said spool to reciprocate in said valve bore; a pair of reaction pistons fitted reciprocatably in said pair of piston bores and around said spool shaft in such a manner as to be driven by said spool stoppers in response to the movement of said spool shaft; a pair of reaction piston stoppers for restricting the movement of said reaction pistons toward the end of said valve bore; and a reaction spring interposed between said reaction pistons.

3. A power steering system according to claim 1, said load sensing valve includes a valve body with a valve bore formed in the inside thereof; a spool disposed reciprocatably in said valve bore such as to form left- and right-turn control pressure chambers at one end of said valve bore and an oil receiver at the other end of said valve bore; a set pressure spring disposed in said oil receiver; a pair of control valve ports, a pair of cylinder ports, a pair of tank lead ports, and a pair of tank ports respectively open to said valve bore and formed in said valve body at predetermined positions thereof such as to be changed over by said spool to effect communication; and a pair of pressure lead ports open to said left- and right-turn control pressure chambers and formed in said valve body.

4. A power steering system according to claim 1, wherein said main booster has an arrangement of the integral type.

5. A power steering system according to claim 1, wherein said main booster has an arrangement of the semi-integral type.

6. A power steering system according to claim 1, further comprising a steering gear box, for forming with said main booster and said control valve a combined type linkage power steering gear assembly.

7. A power steering system according to claim 1, wherein said main and auxiliary boosters have an arrangement of the dual type.

* * * * *